United States Patent
Schümann et al.

(10) Patent No.: US 8,653,221 B2
(45) Date of Patent: Feb. 18, 2014

(54) HYDROXYL-FUNCTIONALISED POLYURETHANE HOT MELT PREPOLYMER

(75) Inventors: Uwe Schümann, Pinneberg (DE); Kirstin Weiland, Hamburg (DE)

(73) Assignee: TESA SE, Hamburg (DE)

( * ) Notice: Subject to any disclaimer, the term of this patent is extended or adjusted under 35 U.S.C. 154(b) by 3 days.

(21) Appl. No.: 12/992,177

(22) PCT Filed: May 12, 2009

(86) PCT No.: PCT/EP2009/055716
§ 371 (c)(1),
(2), (4) Date: Jun. 7, 2011

(87) PCT Pub. No.: WO2009/138402
PCT Pub. Date: Nov. 19, 2009

(65) Prior Publication Data
US 2011/0237760 A1    Sep. 29, 2011

(30) Foreign Application Priority Data

May 13, 2008 (DE) .......................... 10 2008 023 252

(51) Int. Cl.
*C08G 18/00* (2006.01)
(52) U.S. Cl.
USPC ................... 528/77; 528/59; 528/76; 528/85; 560/25; 560/26; 560/158
(58) Field of Classification Search
USPC .............. 528/76, 77, 85, 59; 560/25, 26, 158
See application file for complete search history.

(56) References Cited

U.S. PATENT DOCUMENTS

2005/0027091 A1 *  2/2005  Luhmann et al. ................ 528/44
2009/0286950 A1 *  11/2009  Schumann et al. ............. 528/67

FOREIGN PATENT DOCUMENTS

| EP | 1311574 A | 5/2003 | |
|---|---|---|---|
| EP | 1469055 A | 10/2004 | |
| JP | 2006182795 | * 7/2006 | ............. C09J 175/08 |
| JP | 2006182795 A | 7/2006 | |

OTHER PUBLICATIONS

English Language Abstract for JP2006182795 taken from esp@cenet.com.

* cited by examiner

*Primary Examiner* — Michael L Leonard
(74) *Attorney, Agent, or Firm* — Norris McLaughlin & Marcus PA

(57) ABSTRACT

The invention relates to hydroxyl-functionalised polyurethane hot melt prepolymers comprising the chemical reaction product of isocyanate-reactive starting materials with at least one isocyanate-containing starting material. Said prepolymers are characterized in that the isocyanate-reactive starting materials of the hydroxyl-functionalised polyurethane hot melt prepolymers have a polypropylene glycol with a functionality higher than two and a number-average molar mass higher than or equal to 3,000 g/mol, a polypropylene glycol with a functionality less than or equal to two and a number-average molar mass less than or equal to 1,000 g/mol, and a chain lengthener with a functionality less than or equal to 500 g/mol, and the isocyanate-containing starting material of the hydroxyl-functionalised polyurethane hot melt prepolymer has an aliphatic or alicyclic diisocyanate.

20 Claims, No Drawings

HYDROXYL-FUNCTIONALISED POLYURETHANE HOT MELT PREPOLYMER

This application is a 371 National Phase application of PCT/EP2009/055716 filed May 12, 2009, which claims priority to German application 10 2008 023252.1 filed May 13, 2008.

The present invention relates to a hydroxyl-functionalized polyurethane prepolymer which is solid at room temperature, is meltable, is soluble in numerous solvents, comprises long-chain branching points, and has viscoelastic properties suitable for pressure-sensitive adhesive applications, and also to its use.

A feature of substances having viscoelastic properties suitable for pressure-sensitive adhesive applications is that under mechanical deformation they not only exhibit viscous flow but also develop elastic resilience forces. These two processes, in terms of their respective fraction, are in a particular ratio to one another, which is dependent not only on the precise composition, structure, and degree of crosslinking of the substance under consideration, but also on the rate and duration of the deformation, and on the temperature.

The component viscous flow is necessary in order to obtain adhesion. Only the viscous fractions, brought about by macromolecules having relatively high mobility, allow good wetting and good flow onto the substrate where bonding is to take place. A high viscous flow component results in a high inherent tack (also referred to as pressure-sensitive adhesiveness) and hence often also in a high bond strength. Highly crosslinked systems, crystalline or glassily solidified polymers do not have inherent tack, generally speaking, owing to a lack of flowable components.

The component elastic resilience forces are necessary in order to obtain cohesion. They are brought about, for example, by very long-chain macromolecules with a high degree of interentanglement, and also by physically or chemically crosslinked macromolecules, and allow the transmission of the forces that act on an adhesive bond. The elastic resilience forces mean that an adhesive bond is able adequately to withstand, over a relatively long time period, a long-term load that is acting on it, in the form, for example, of a sustained shearing load.

For more precise description and quantification of the degree of elastic and viscous components, and also of the ratio of the components to one another, it is possible to employ the parameters—determinable by means of Dynamic Mechanical Analysis (DMA)—of storage modulus (G'), loss modulus (G"), and also the ratio G"/G', which is identified as loss factor tan δ (tan delta). G' is a measure of the elastic component, G" a measure of the viscous component, of a substance. Both parameters are dependent on the deformation frequency and on the temperature.

The parameters can be determined by means of a rheometer. The material under analysis, in a plate/plate arrangement, for example, is subjected to a sinusoidally oscillating shearing stress. In the case of shear stress-controlled instruments, the deformation is measured as a function of time, and the time lapse of this deformation relative to the introduction of the shear stress is measured. This time lapse is identified as phase angle δ.

The storage modulus G' is defined as follows: $G'=\tau/\gamma \cdot \cos(\delta)$ ($\tau$=shear stress, $\gamma$=deformation, $\delta$=phase angle=phase shift between shear stress vector and deformation vector). The definition of the loss modulus $G''=\tau/\gamma \cdot \sin(\delta)$ ($\tau$=shear stress, $\gamma$=deformation, $\delta$=phase angle=phase shift between shear stress vector and deformation vector).

A substance is generally considered suitable for pressure-sensitive adhesive (PSA) applications in terms of its viscoelastic properties when at room temperature in the frequency range from $10^0$ to $10^1$ rad/sec, ideally in the frequency range from $10^{-1}$ to $10^2$ rad/sec, G' is located in the range from $10^3$ to $10^6$ Pa and when G" likewise is located in this range. Within this range, which in a matrix plot of G' and G" (G' plotted as a function of G") may also be termed the viscoelastic window for PSA applications, or as the PSA window, in accordance with viscoelastic criteria, there are, in turn, different sectors and quadrants which more closely characterize the pressure-sensitive adhesive properties to be expected from the associated substances. Substances with high G" and low G' within this window, for example, are generally notable for a high bond strength and a low shear strength, while substances with a high G" and high G' are notable both for a high bond strength and for a high shear strength.

Generally speaking, the findings concerning the relationships between rheology and pressure-sensitive adhesiveness are state of the art and are described, for example, in "Sates, Handbook of Pressure Sensitive Adhesive Technology, Third Edition, (1999), pp. 153-203".

One of many alternative possibilities for characterizing the viscoelastic properties of a substance is to determine the tensile strain properties and the relaxation behavior in a tensile strain test. In the tensile strain test, parameters determined include the tensile strength and the associated strain. The relaxation behavior may likewise be determined in a tensile strain test. This is done by measuring the stress at the moment a defined strain is reached. The stress is defined as the tensile force on the sample body, relative to the initial cross-sectional area within the measurement length. This strain is maintained further. After a certain time, the stress is determined again. The percentage decrease in the stress is the relaxation.

Considering an adhesive tape or another kind of self-adhesive article, the viscoelastic properties suitable for PSA applications are initially important for the PSA layer of the self-adhesive article. For other layers of an adhesive tape as well, however, the viscoelastic properties suitable for PSA applications may be important. This is because the PSA properties of an adhesive tape are influenced not only by the viscoelastic properties of the PSA layer, but also by the corresponding properties of the other layers, and also the thicknesses of the layers. The principle of the viscoelastic window for PSA applications is propagated, so to speak, through all of the layers of an adhesive tape. Hence a layer having viscoelastic properties suitable for PSA applications may often also be used advantageously as a carrier layer. Even for functional layers of an adhesive tape, the viscoelastic properties suitable for PSA applications may be advantageous. Functional layers may be, for example, primer layers or layers having particular optical, electrical or heat-conducting properties, to give but a few examples.

In respect of the production of self-adhesive articles in a continuous coating operation, there are diverse known technologies. Fundamentally a distinction may be made between solvent-based and solvent-free technologies.

In solvent-based systems, the pressure-sensitively adhesive polymer or pressure-sensitively adhesive substance mixture is usually present uncrosslinked in solution prior to coating. Shortly before coating onto a carrier or auxiliary carrier, a chemical crosslinker may be admixed. After coating has taken place, and after the evaporation of the solvent, the pressure-sensitively adhesive polymer or substance mixture is present in the form of a film or filmlike layer on the carrier or auxiliary carrier, and can be wound up, independently of whether the crosslinking process has already concluded or not. Generally speaking, the crosslinking has no marked influence on the solid character of the pressure-sensitively adhesive polymer or substance mixture, this solid character being the basic prerequisite for windability.

Solvent-based technologies have the fundamental disadvantage that they are not suitable for producing thick layers, especially not when coating is to take place at an economically acceptable speed. Even at layer thicknesses above about 100 to 150 µm, there is increased, visible blistering as a result of the evaporating solvent, and hence there are distinct quality detractions, meaning that the layer can then no longer be considered for use in an adhesive tape. In the context of production of thinner layers as well, the coating speed is limited considerably by the need to evaporate the solvent. Moreover, solvent-based coating operations give rise to considerable operational costs as a result of the need for solvent recovery or incineration.

Solvent-free systems can be subdivided into reactive systems, which are liquid, syruplike or pastelike even without solvent at room temperature, and into hotmelt systems, where the pressure-sensitively adhesive polymer or substance mixture is solid at room temperature and, when heat is applied, can be melted.

Typical examples of reactive systems which are liquid, syruplike or pastelike at room temperature are the well-known two-component polyurethanes, epoxides or silicones. Reactive systems of this kind can be used to produce both thin and thick layers, this being a great advantage over solvent-based systems.

In relation, however, to adhesive tape manufacturing, reactive systems which are liquid, syruplike or pastelike at room temperature have the disadvantage that in this state they cannot be wound up, or at least not with constant layer thickness, especially not when the layer thicknesses are high. With constant layer thickness it is possible to wind up only those polymer films which are solid. The solidification of solvent-free reactive systems that are liquid at room temperature is tied to the progress of a chemical reaction which in general begins after the components have been mixed. Reaction progress requires a certain time. Only when the film has solidified as a result of a sufficiently high degree of conversion in the chemical reaction in question is it possible for the film coated onto a carrier or auxiliary carrier to be wound up. Accordingly, the coating speed for such systems is limited.

The polyurethane-based PSAs described in EP 1 469 024 A2, in EP 1 469 055 B1, in EP 1 849 811 A1 or in WO 2008/009542 fall within this category of reactive systems. As a film and/or PSA layer, as part of an adhesive tape, therefore, they can be produced only with a coating speed which is limited and hence, as a general rule, not very economic.

The polyurethane-based self-adhesive tape carriers described in EP 0 801 121 B1 and EP 0 894 841 B1 also, like the PSAs set out above, have the disadvantage that they are produced during coating from liquid or pastelike components. Here as well, therefore, it is necessary to wait for the progress of reaction until these carriers can be wound up, and this limits the coating speed and hence the economics of production.

The same disadvantage applies in respect of the substances produced by the process described in EP 1 095 993 B1 for the continuous production of self-adhesive articles from two-component polyurethanes.

Adhesive tapes or adhesive-tape layers based on syruplike components are described for example in EP 0 259 094 B1 or in EP 0 305 161 B1, where polymer buildup or crosslinking is achieved through photopolymerization.

These reactive systems as well have the disadvantage that in their syruplike state they cannot be wound up, or at least not with constant layer thickness. Here again, windability is tied to reaction progress, which requires a certain time. Hence these systems as well are limited in terms of coating speed.

Liquid, syruplike or pastelike reactive systems whose polymer buildup and whose crosslinking are initiated externally, as for example by UV or EBC radiation, have the additional disadvantage, in general, that polymer buildup with consistently homogeneous properties occurs only when the radiation, uniformly, reaches all of the molecules involved in polymer buildup, through the entire thickness of the film. Particularly at high layer thicknesses or with systems that are filled with fillers, this is not the case, and so such films then have an inhomogeneously crosslinked polymer framework.

As compared with the liquid, syruplike or pastelike reactive systems, hotmelt systems have the advantage that they can be used to obtain high coating speeds, especially in the context of their processing in extrusion operations. In extrusion operations, meltable polymers which at room temperature are solid (hotmelts) are melted, and in that state, at higher temperatures, they are shaped to a film, and coated, generally, onto a carrier or auxiliary carrier. After cooling and hence solidification have taken place, winding may be carried out immediately. The windability is not tied to the progress of a chemical reaction. The operation of cooling a film generally takes up only comparatively little time. As with the liquid, syruplike or pastelike reactive systems, hotmelt systems as well can be used to produce layers without any fundamental limitation in thickness. In the adhesive-tape area, it is primarily styrene block copolymer PSAs, described for example in DE 100 03 318 A1 or DE 102 52 088 A1, that are coated in this way.

For hotmelt systems, however, in general, owing to the high processing temperatures and the associated restriction for thermal crosslinking processes, the problem arises that, when crosslinking layers using actinic radiation, the thickness-restricted depth of penetration and thickness-dependent intensity of penetration of the radiation mean that homogeneous crosslinking right through the layer is not possible, especially for thick layers.

Thermoplastic polyurethanes as well can be processed by hotmelt operations. DE 20 59 570 A describes, for example, a continuous one-step production process for a nonporous thermoplastic polyurethane.

The preparation of thermoplastically processable polyurethanes from an OH-terminated linear prepolymer prepared initially as an intermediate is described in DE 10 2005 039 933 A, for example. DE 22 48 382 C2 as well describes the preparation of thermoplastic polyurethanes from OH-terminated prepolymers in a multistage operation. These specifications do not use any polyols having a functionality higher than two. Indications of viscoelastic properties suitable for PSA applications on the part of the polyurethanes preparable by the teachings of these specifications are not given. In US 2007/0049719 A1 as well, hydroxyl-terminated polyurethane prepolymers are described. There again, the prepolymers are exclusively linear, constructed from purely difunctional starting materials without branching sites. Indications of viscoelastic properties suitable for PSA applications are not given there either.

Hydroxyl-terminated polyurethane prepolymers are likewise described in US 2007/0129456 A1. These polymers serve for producing synthetic leather, and are liquid or semi-solid at room temperature. They comprise crystalline polyether polyol and crystalline polyester polyol. No indications are given of viscoelastic properties suitable for PSA applications. Nor are there any indications given of these prepolymers having a sufficiently solid character to be wound up in the form of an adhesive-tape roll.

Hotmelt coating operations based on thermoplastic or thermoplastically processable polymers do have the advantages of a high achievable coating speed and the capacity to produce thick layers, but lead to polymer films which are not crosslinked or at least not adequately crosslinked, with the consequence that these films are unsuitable for use as adhesive-tape layers, for which a high long-term robustness, particularly at elevated temperatures, is a must.

The extrusion of polyurethane elastomers using triols that might lead to a crosslinked character in the elastomers is known from DE 19 64 834 A and from DE 23 02 564 C3, for example. These specifications, however, describe the reaction of liquid starting materials, with the attendant disadvantage that, before such elastomers are wound up, it is necessary to await the solidification that is dependent on reaction progress. Indications of viscoelastic properties suitable for PSA applications in respect of the products produced by the processes described in these specifications are not given. In the processes described in these specifications, moreover, only isocyanate-terminated, rather than hydroxyl-terminated, prepolymers are used. The molecular weight of the triols used in these specifications has an upper limit of 500.

EP 135 111 B1 describes the preparation of polyurethanes which are branched, but are thermoplastically processable and hence not crosslinked, in a multistage process. Proposed as a first intermediate A is an OH-terminated prepolymer constructed from substantially linear polyhydroxyl compounds of relatively high molecular weight. The lower limit on the molecular weight of the polyhydroxyl compounds is put at 550. Indications of viscoelastic properties suitable for PSA applications, or of hotmelt properties on the part of the OH-terminated prepolymer, are not given.

JP 2006/182795 describes a hydroxyl-functionalized polyurethane prepolymer formed from a polyether polyol mixture, consisting of a polyether diol and a polyether triol, and polyisocyanate. The average functionality of the polyol mixture is 2.2 to 3.4. Further, the reaction of this prepolymer with a polyfunctional isocyanate to form a film of adhesive is described. The hydroxyl-functionalized polyurethane prepolymer in JP 2006/182795, however, is not a hotmelt. In JP 2006/182795, the molecular weight of the diols is given a lower limit of 700. No indications are given of viscoelastic properties suitable for PSA applications.

Hotmelt coating operations leading to crosslinked polymer films are known from DE 10 2004 044 086 A1, for example. Described therein is a method for producing an adhesive tape based on an acrylate hotmelt PSA, to which, in its melted state in an extruder, a thermal crosslinker is added.

One difficulty in the method described therein is the need first to polymerize the acrylate hotmelt PSA in a solvent and then to remove this solvent again by means of a concentrating extruder. A further disadvantage is the relatively high molar mass of the polyacrylate (weight-average $M_w$: 300 000 to 1 500 000 g/mol). High molar masses dictate high processing temperatures and hence high operating costs, and in extrusion operations, moreover, may result in unequal polymer properties in longitudinal and transverse directions.

It is an object of the invention to provide a substance or a composition of matter that avoids or at least attenuates the disadvantages of the prior art.

With particular advantage, a substance or composition of this kind ought to meet one, and advantageously two or more, preferably all, of the following criteria:

The substance and the composition shall have viscoelastic properties suitable for pressure-sensitive adhesive applications—that is, both the storage modulus G' and the loss modulus G" of the substance or composition shall be situated in the range from $10^3$ Pa to $10^6$ Pa, as determined at room temperature in the deformation frequency range from $10^0$ to $10^1$ rad/sec, preferably in the deformation frequency range from $10^{-1}$ to $10^2$ rad/sec, by Dynamic Mechanical Analysis (DMA) using a shear stress-controlled rheometer in a plate/plate arrangement. The substance and the composition shall be chemically crosslinkable and shall in particular, even after crosslinking, have viscoelastic properties suitable for PSA applications, in accordance with the criteria set out above. In terms of their viscoelastic properties, the substance and the composition shall allow a broad spectrum of variation possibilities, hence allowing a broad spectrum of PSA properties to be set. The substance and the composition, after crosslinking, shall be suitable for use as carrier layers, PSA layers or else as functional layers in adhesive tapes or other self-adhesive articles.

The substance and the composition shall be hotmelts, which means that they shall be solid at room temperature and meltable by supply of heat.

The substance and the composition shall optionally be coatable and crosslinkable in a continuous coating and crosslinking operation, as in an extrusion process, for example, or in a discontinuous process.

The substance and the composition shall be such that they do not have the disadvantages of the prior art, or at least not to the same extent. In particular, the substance and the composition shall be amenable to solvent-free preparation and processing. Where necessary, however, they shall also be able to be prepared and processed in solvents. The crosslinked polymer films produced from the substance or composition in an extrusion operation shall have properties that are equal in longitudinal and transverse directions.

This object is achieved by means of a hydroxyl-functionalized polyurethane hotmelt prepolymer as recorded in the main claim. The dependent claims provide advantageous developments of the prepolymer, of the process for preparing it, and of its possibilities for use.

The present invention relates more particularly to a hydroxyl-functionalized polyurethane prepolymer which is solid at room temperature, is meltable, is soluble in numerous solvents, comprises long-chain branching sites, and has viscoelastic properties suitable for PSA applications. Through reaction with at least difunctional polyisocyanates and coating during the reaction phase, it is possible to produce from this prepolymer a chemically crosslinked polyurethane film having viscoelastic properties that are suitable for PSA applications, and which may therefore find use as a PSA layer, carrier layer or functional layer in adhesive tapes or other self-adhesive articles. The reaction with the at least difunctional polyisocyanates may take place optionally in solution or in the melt. The crosslinking and coating operation may optionally take place continuously, such as in an extrusion process, for example, or discontinuously.

The main claim relates to a hydroxyl-functionalized polyurethane hotmelt prepolymer which is or comprises the chemical reaction product of isocyanate-reactive starting materials with at least one isocyanate-containing starting material, characterized in that the isocyanate-reactive starting materials of the hydroxyl-functionalized polyurethane hotmelt prepolymer are or comprise at least one polypropylene glycol having a functionality of more than two and a number-average molar mass of greater than or equal to 3000 g/mol (referred to below as "polypropylene glycol PI"), at least one polypropylene glycol having a functionality of less than or equal to two and a number-average molar mass of less than or equal to 1000 g/mol (referred to below as "polypropylene glycol PII"), and a chain extender having a functionality of less than or equal to two and a number-average molar mass of less than 500 g/mol (referred to below as "chain extender KI"), and in that the isocyanate-containing starting material of the hydroxyl-functionalized polyurethane hotmelt prepolymer is or comprises an aliphatic or alicyclic diisocyanate.

The hydroxyl-functionalized polyurethane hotmelt prepolymer, therefore, is characterized in particular in that it is obtainable by reaction of at least three isocyanate-reactive components and at least one isocyanate-containing component. In one advantageous embodiment of the invention, the number-average molar mass of the polypropylene glycol PII is at least twice as great, or greater, than that of the chain extender KI, and with particular preference is at least three times as great or greater.

Polymers or prepolymers which possess the capacity to be meltable and hence to be thermoplastically processable are identified in this specification, as is usual in the jargon of the skilled worker, as hotmelts.

A polyurethane hotmelt prepolymer in this specification means a reaction production, especially a meltable reaction product, which is obtained by chemical reaction of a mixture comprising two or more polyols with one or more polyisocyanates, and which at room temperature has a solidity and dimensional stability such that a compounding operation is possible at room temperature in known mixing assemblies (and also, in particular, a shaping operation or similar processing steps) without the addition of solvents, diluents or other viscosity-lowering adjuvants. Examples of known mixing assemblies include compounders, internal mixers, extruders, planetary roller extruders, planetary mixers, butterfly mixers or dissolvers. The processability of a meltable reaction product for the purposes of this specification is possible only when the meltable reaction product is heated, it being possible for the heat to be supplied from the outside, by heating, or to be generated by shearing. Typical processing temperatures for meltable reaction products for the purposes of this specification are in the range from 70° to 160° C., and are at least 40° C. Room temperature for the purposes of this specification is the temperature range from 20° C. to 25° C., ideally 23° C.

A meltable reaction product for the purposes of this specification has a complex viscosity, measured with a rheometer in an oscillation experiment with a sinusoidally oscillating shearing stress in a plate/plate arrangement, at a temperature of 23° C. and an oscillation frequency of 10 rad/s, of at least 8000 Pas, preferably at least 10 000 Pas. At 70° C. and a frequency of 10 rad/s, the complex viscosity is at least 100 Pas, preferably at least 200 Pas.

The complex viscosity $\eta^*$ is defined as follows:

$$\eta^* = G^*/\omega$$

($G^*$=complex shear modulus, $\omega$=angular frequency).
The further definitions are as follows: $G^* = \sqrt{(G'')^2 + (G')^2}$
($G''$=viscosity modulus (loss modulus), $G'$=elasticity modulus (storage modulus)).

$G'' = \tau/\gamma \cdot \sin(\delta)$ ($\tau$=shear stress, $\gamma$=deformation, $\delta$=phase angle=phase shift between shear stress vector and deformation vector).

$G' = \tau/\gamma \cdot \cos(\delta)$ ($\tau$=shear stress, $\gamma$=deformation, $\delta$=phase angle=phase shift between shear stress vector and deformation vector).

$\omega = 2\pi \cdot f$ (f=frequency).

Surprisingly it has been found that viscoelastic properties suitable for PSA applications, in combination with the hotmelt properties and the crosslinkability through further reaction of the hydroxyl-functionalized polyurethane hotmelt prepolymer with one or more polyisocyanates, are achieved in particular when the hydroxyl-functionalized polyurethane hotmelt prepolymer comprises branching sites and when the substances from which the branching sites start are or comprise isocyanate-reactive starting materials of the hydroxyl-functionalized polyurethane hotmelt prepolymer that in turn are or comprise at least one polypropylene glycol having a functionality of more than two and a number-average molar mass of greater than or equal to 3000 g/mol (polypropylene glycol PI), at least one polypropylene glycol having a functionality of less than or equal to two and a number-average molar mass of less than or equal to 1000 g/mol (polypropylene glycol PII) and at least one chain extender having a functionality of less than or equal to two and a number-average molar mass of less than or equal to 500 g/mol (chain extender KI), and when the isocyanate-containing starting material of the hydroxyl-functionalized polyurethane hotmelt prepolymer is or comprises an aliphatic or alicyclic diisocyanate. Branching sites start, furthermore, from all molecules with a functionality of three or more that participate in the chemical construction of the hydroxyl-functionalized polyurethane hotmelt prepolymer. The extent of the branching is adjusted, in interaction with the length of the prepolymer chains produced, in such a way as to ensure that this hydroxyl-functionalized polyurethane prepolymer is meltable, in other words that, unless additional crosslinking substances are added, no crosslinked structures are formed. Only when the fraction of branching sites in the prepolymer exceeds a certain level, whose calculation or arithmetical estimation is described briefly below, does gelling begin—that is, crosslinked structures are formed.

The ratio of the total number of isocyanate groups to the total number of hydroxyl groups, referred to for short below as NCO/OH ratio, of the starting materials participating in the molecular construction of the hydroxyl-functionalized polyurethane hotmelt prepolymer is in particular less than 1.0, in order to achieve hydroxyl functionalization. In order to rule out crosslinked structures, the so-called gel point must not be exceeded. The theoretical gel point can be calculated using the gel point equation of P. J. Flory. A formula derived from the Flory equation and used for estimating the gelling NCO/OH ratio in polyurethane formation reactions from diols and triols with diisocyanates in deficit runs as follows:

$$\left(\frac{NCO}{OH}\right)_{Gelling} = \frac{1}{1 + \frac{1}{\frac{(Diol\ OH)}{(Triol\ OH)} + 1}}$$

If the gelling NCO/OH ratio is attained or exceeded, it is likely that crosslinked structures will form, and hence that gelling will set in. In practice, however, this is often not the case, since many of the commercially available diols and triols also include a—usually undefined—fraction of monofunctional molecules. Hence the formula provides only an approximate indication of the NCO/OH ratio at which the actual gelling point is attained. Diol OH in this formula refers to the total number of hydroxyl groups participating in the prepolymer formation reaction and originating from difunctional polyols. Triol OH, accordingly, is the total number of hydroxyl groups participating in the prepolymer formation reaction and attached to trifunctional polyols. Where, for example, exclusively trifunctional polyols are reacted with diisocyanate to give a hydroxyl-functionalized prepolymer, the critical NCO/OH ratio is 0.5. If this NCO/OH ratio is exceeded, it is likely that crosslinked structures will form, and hence that gelling will take place, leading to unmeltable prepolymers.

In order to ensure that the hydroxyl-functionalized polyurethane prepolymer is solid at room temperature, it is necessary to take care that the crystalline melting point, the glass transition temperature or both is or are above room temperature or at least in the vicinity of room temperature. This can be done in a variety of ways via the selection and association of the polyisocyanates and polyols participating in the reaction to form the hydroxyl-functionalized polyurethane hotmelt prepolymer. For example, crystalline polyols which are solid at room temperature can be used, or a high fraction of short-chain polyols can be used, leading, after reaction with the polyisocyanate, to a high fraction of hard segments within the prepolymer structure. The skilled person, however, must assume that a hydroxyl-functionalized polyurethane prepolymer has no viscoelastic properties suitable for PSA applications as soon as the crystalline melting point, the glass transition temperature or possibly both lies or lie above room temperature or at least in the vicinity of room temperature.

Surprisingly it has been found that the hotmelt properties in combination with the crosslinkability and with the viscoelastic properties that are suitable for PSA applications are achieved when the isocyanate-reactive starting materials of the hydroxyl-functionalized polyurethane hotmelt prepolymer comprise at least one polypropylene glycol PII having a functionality of less than or equal to two and a number-average molar mass of less than or equal to 1000 g/mol and at least one chain extender KI having a functionality of less than or equal to two and a number-average molar mass of less than or equal to 500 g/mol, when the isocyanate-containing starting material of the hydroxyl-functionalized polyurethane hotmelt prepolymer comprises an aliphatic or alicyclic diisocyanate, and when, moreover, the isocyanate-reactive starting materials of the hydroxyl-functionalized polyurethane hotmelt prepolymer comprise a polypropylene glycol PI having a functionality of greater than two and a number-average molar mass of greater than or equal to 3000 g/mol.

The hotmelt character can be achieved advantageously by providing for the numerical fraction of the molecules participating in the molecular construction of the hydroxyl-functionalized polyurethane hotmelt prepolymer and having a relative molar mass of less than or equal to 1000 g/mol to be at least 70%, preferably at least 80%. The numerical fraction corresponds always to the amount-of-substance fraction.

Viscoelastic properties suitable for particularly typical, "general purpose" PSA applications can be achieved, in combination with the hotmelt properties and the crosslinkability, when the numerical fraction of the hydroxyl groups that are introduced to form the hydroxyl-functionalized polyurethane hotmelt prepolymer and that originate from a polypropylene glycol having a functionality of more than two and a number-average molar mass of greater than or equal to 3000 g/mol (polypropylene glycol PI) is at least 2.5%, preferably at least 5.0% and/or not more than 25.0%, preferably not more than 20.0%. Viscoelastic properties suitable for particularly typical, "general purpose" PSA applications can further be achieved advantageously, in combination with the hotmelt properties and the crosslinkability, when the number-average molar mass of the polypropylene glycol PI having a functionality of greater than two is greater than or equal to 4500 g/mol, preferably greater than or equal to 5500 g/mol, the number-average molar mass of the polypropylene glycol PII having a functionality of less than or equal to two is less than or equal to 800 g/mol, preferably less than or equal to 600 g/mol, or when the number-average molar mass of the chain extender KI having a functionality of less than or equal to two is less than or equal to 400 g/mol, preferably less than or equal to 200 g/mol. A particularly preferred chain extender is 2-methyl-1, 3-propanediol.

In order to achieve the viscoelastic properties suitable for the particularly typical, "general purpose" PSA applications, it has emerged as being particularly favorable if the aliphatic or alicyclic diisocyanate is or comprises dicyclohexylmethane diisocyanate and/or isophorone diisocyanate.

With a view to the use of the hydroxyl-functionalized polyurethane hotmelt prepolymer as a layer in an adhesive tape or in a self-adhesive article, it has been found that particularly advantageous viscoelastic properties that are suitable for PSA applications and that allow the development of customized adhesive tape layers, tailored to variable, changing profiles of requirements, are achieved when the prepolymer chains formed are as long as possible, irrespective of whether the hydroxyl-functionalized polyurethane hotmelt prepolymer is reacted further with polyisocyanates, and in particular, therefore, crosslinked. This is achieved by setting the ratio of the total number of isocyanate groups to the total number of hydroxyl groups of the starting materials participating in the molecular construction of the hydroxyl-functionalized polyurethane hotmelt prepolymer at between greater than or equal to 0.80 and less than or equal to 0.98, preferably between greater than or equal to 0.85 and less than or equal to 0.97, more preferably between greater than or equal to 0.90 and less than or equal to 0.96. The weight-average molar masses of the resulting prepolymers are then around 50 000 to 150 000 g/mol. This is a range which allows trouble-free coating as a holtmelt, without producing marked, different properties of the resultant film in longitudinal and transverse directions, such properties being disruptive to the uses.

Particularly advantageous viscoelastic properties suitable for PSA applications are achieved, moreover, when a weight fraction of greater than or equal to 70% by weight of the polyols participating in the formation of the hydroxyl-functionalized polyurethane hotmelt prepolymer are polyether polyols, preferably polypropylene glycols.

With a view to the use of the hydroxyl-functionalized polyurethane hotmelt prepolymer as a layer in an adhesive tape or in a self-adhesive article, it is possible, after the reaction with polyisocyanate, to achieve an advantageous degree of crosslinking if, beforehand, the numerical fraction of the molecules that have a functionality of more than two and that participate in the molecular construction of the hydroxyl-functionalized polyurethane hotmelt prepolymer is at least 0.5%, preferably at least 2.0%.

Generally speaking, polyurethane prepolymers are prior art in their preparation and are described in, for example, "Kunststoff-Handbuch, Polyurethane, ed.: Guenter Oertel, $3^{rd}$ edition, 88-103, (1993)".

Isocyanate-reactive starting materials for preparing the hydroxyl-functionalized polyurethane hotmelt prepolymer may be all known polyols such as, for example, polyether polyols, especially polyethylene glycols or polypropylene glycols, polyester polyols, polycarbonate polyols, polytetramethylene glycol ethers(polytetrahydrofurans), hydrogenated and non-hydrogenated hydroxyl-functionalized polybutadiene derivatives, hydrogenated and non-hydrogenated hydroxyl-functionalized polyisoprenes, hydroxyl-functionalized polyisobutylenes, hydroxyl-functionalized polyolefins or hydrogenated and non-hydrogenated hydroxyl-functionalized hydrocarbons. Preferred polyols are polypropylene glycols. As polypropylene glycols it is possible to use all commercial polyethers based on propylene oxide and on a difunctional starting compound, in the case of the diols, and on a trifunctional starting compound, in the case of the triols. These include not only the polypropylene glycols prepared conventionally, i.e., in general, with a basic catalyst, such as potassium hydroxide, for example, but also the particularly pure polypropylene glycols which are prepared with DMC (double metal cyanide) catalysis and whose preparation is described in, for example, U.S. Pat. Nos. 5,712,216, 5,693,584, WO 99/56874, WO 99/51661, WO 99/59719, WO 99/64152, U.S. Pat. No. 5,952,261, WO 99/64493, and WO 99/51657. A characteristic of the DMC-catalyzed polypropylene glycols is that the "nominal" or theoretical functionality of exactly 2 in the case of the diols or exactly 3 in the case of the triols is also actually approximated. With the conventionally prepared polypropylene glycols, the "true" functionality is always somewhat lower than its theoretical counterpart, and this is the case particularly with polypropylene glycols having a relatively high molar mass. The reason is a secondary rearrangement reaction of the propylene oxide to give allyl alcohol. It is also possible, moreover, to use all polypropylene glycol diols and triols in which ethylene oxide is copolymerized as well, this being the case in many commercial polypropylene glycols, in order to achieve an increased reactivity with respect to isocyanates.

Other isocyanate-reactive substances as well, such as polyetheramines, for example, may be involved in the synthesis of the hydroxyl-functionalized polyurethane hotmelt prepolymer.

Generally, for the purposes of this specification, isocyanate-reactive substances are all substances containing active hydrogen. Active hydrogen is defined as hydrogen which is bonded to nitrogen, oxygen or sulfur and which reacts with methylmagnesium iodide in butyl ethers or other ethers in a reaction in which methane is evolved.

Chain extenders for the purposes of this specification are all isocyanate-reactive compounds having a functionality of less than or equal to two and a number-average molar mass of less or equal to 500 g/mol. In general these are difunctional compounds of low molar mass such as, for example, 1,2-ethanediol, 1,2-propanediol, 1,3-propanediol, 2-methyl-1,3-propanediol, 1,4-butanediol, 2,3-butanediol, propylene glycol, dipropylene glycol, 1,4-cyclohexanedimethanol, hydroquinone dihydroxyethyl ether, ethanolamine, N-phenyldiethanolamine, or m-phenylenediamine. The chain extender title also, however, embraces the above-described polyols, especially the polypropylene glycols, provided that their functionality is less than or equal to two and their number-average molar mass is less than or equal to 500 g/mol.

Crosslinkers as well may be used. Crosslinkers are isocyanate-reactive compounds of low molar mass that have a functionality of more than two. Examples of crosslinkers are glycerol, trimethylolpropane, diethanolamine, triethanolamine and/or 1,2,4-butanetriol.

Monofunctional, isocyanate-reactive substances, such as monools, for example, may likewise be used. They serve as chain terminators and may therefore be used to control the chain length.

Isocyanate-containing starting materials contemplated for the preparation of the hydroxyl-functionalized polyurethane hotmelt prepolymer include, for example, isophorone diisocyanate, hexamethylene diisocyanate, dicyclohexylmethane 4,4'-diisocyanate, tolylene diisocyanate, diphenylmethane 4,4'-diisocyanate or m-tetramethylxylene diisocyanate (TMXDI), mixtures of the stated isocyanates, or isocyanates derived from them chemically, examples being dimerized, trimerized or polymerized types which contain, for example, urea, uretdione or isocyanurate groups. One example of a dimerized type is the HDI uretdione Desmodur N 3400® from Bayer. One example of a trimerized type is the HDI isocyanurate Desmodur N 3300®, likewise from Bayer. Examples of aliphatic and cycloaliphatic diisocyanates are isophorone diisocyanate, hexamethylene diisocyanate or dicyclohexylmethane 4,4'-diisocyanate. Particularly preferred are isophorone diisocyanate and dicyclohexylmethane 4,4'-diisocyanate.

In order to accelerate the reaction of the isocyanate-reactive starting materials with the at least one isocyanate-containing starting material, it is possible to use one or more catalysts known to the skilled person, such as tertiary amines, organobismuth compounds or organotin compounds, for example, to name but a few.

With great advantage it is possible to use catalysts comprising bismuth and carbon, preferably a bismuth carboxylate or a bismuth carboxylate derivative.

The concentration of the catalysts is harmonized with the polyisocyanates and polyols used and also with the desired residence time in the mixing assembly and the temperature in the mixing assembly. Generally speaking, the concentration is between 0.01% by weight and 0.5% by weight of the chemically crosslinked polyurethane film to be prepared.

In one possible embodiment, the hydroxyl-functionalized polyurethane hotmelt prepolymer comprises one or more further formulating constituents such as, for example, fillers, microbeads, resins, especially tackifying hydrocarbon resins, plasticizers, aging inhibitors (antioxidants), light stabilizers, UV absorbers, rheological additives, and other auxiliaries and adjuvants.

Fillers which can be used include reinforcing fillers, such as carbon black, for example, and nonreinforcing fillers, such as chalk or barium sulfate, for example. Other examples are talc, mica, fumed silica, silicates, zinc oxide, solid glass microbeads, hollow glass microbeads and/or plastics microbeads of all kinds. Mixtures of the substances stated may also be used.

The use of antioxidants is advantageous though not mandatory.

The suitable antioxidants include, for example, sterically hindered phenols, hydroquinone derivatives, amines, organic sulfur compounds or organic phosphorus compounds.

Light stabilizers and UV absorbers may optionally also be employed.

Light stabilizers used include, for example, the compounds disclosed in Gaechter and Müller, Taschenbuch der Kunststoff-Additive, Munich 1979, in Kirk-Othmer (3rd) 23, 615 to 627, in Encycl. Polym. Sci. Technol. 14, 125 to 148, and in Ullmann (4th) 8, 21; 15, 529, 676.

Examples of rheological additives which may optionally be added are fumed silicas, phyllosilicates (bentonites), high molecular mass polyamide powders or powdered castor oil derivatives.

The additional use of plasticizers is likewise possible, but ought preferably to be avoided on account of their strong migration tendencies.

The hydroxyl-functionalized polyurethane hotmelt prepolymer may be prepared batchwise (i.e., discontinuously), as for example in a heatable compounder, planetary mixer or dissolver, or continuously, as for example in an extruder or by means of a two-component mixing and metering system. The hydroxyl-functionalized polyurethane hotmelt prepolymer may also be prepared in steps, in which case combinations of the mixing techniques are also possible. In order to ensure absence of bubbles, mixing takes place preferably under reduced pressure.

The invention further provides for the further processing of the hydroxyl-functionalized polyurethane hotmelt prepolymer, especially for the production of polyurethane moldings and/or polyurethane layers.

The hydroxyl-functionalized polyurethane hotmelt prepolymer of the invention can be used in order—especially in a continuous process regime—to be mixed in the melt (in particular, therefore, solventlessly) with one or more at least difunctional polyisocyanates in a mixing assembly and therefore to be chemically reacted, in particular continuously, in order ultimately to give a chemically crosslinked polyurethane molding or film, in particular having viscoelastic properties suitable for PSA applications.

Continuously or continuous process regime means that, during mixing, the substances to be mixed are supplied continually and at a uniform rate to the mixing assembly, in other words are introduced into said assembly, and the mixture in which the gradual chemical reaction to give the polymer progresses departs continually and at a uniform rate at another location from the mixing assembly. In the mixing assembly, therefore, in the course of mixing, there is a continual, uniform flow process and/or transport process. The residence time of the substances in the mixing assembly from introduction to departure in the form of a chemically reacting mixture (in particular, therefore, the reaction time of the polyurethane hotmelt prepolymer with the polyisocyanate or polyisocyanates prior to shaping) preferably does not exceed 10 minutes and very preferably amounts to 2 seconds to 5 minutes.

The functionality of the polyisocyanates with which the hydroxyl-functionalized polyurethane hotmelt prepolymer of the invention is reacted, and the ratio of the total number of isocyanate groups to the total number of hydroxyl groups of the in the molecular construction of the polymer formed, as a result, through the continuously progressing chemical reaction, are preferably set such that, following complete reaction, the film is chemically crosslinked and therefore no longer meltable. As a general rule, an NCO/OH ratio of between 1.0 and 1.1 is selected. An NCO/OH ratio of greater than 1.0, in other words an NCO excess, results in a polymer chain build up or in crosslinking, via a reaction with the virtually ubiquitous ambient humidity. An NCO/OH ratio of less than 1.0 may be selected in particular when polyisocyanates are used that have a functionality of three or more. Suitable polyisocyanates are all at least difunctional polyisocyanates.

Polyisocyanates contemplated are, for example, all polyisocyanates referred to when describing the polyisocyanates for preparing the hydroxyl-functionalized polyurethane hotmelt prepolymer of the invention.

The continuous mixing of the melted, hydroxyl-functionalized polyurethane hotmelt prepolymer according to the invention with one or more at least difunctional polyisocyanates takes place preferably in a continuously operating mixing assembly, preferably in an extruder, more particularly a twin-screw or planetary roller extruder, or in a heatable two-component mixing and metering system. Connected cascades of continuous or batch mixing assemblies are likewise suitable. The design of the mixing assembly is preferably such that effective mixing is ensured in a short residence time in the mixing assembly. The addition of the melted, hydroxyl-functionalized polyurethane hotmelt prepolymer according to the invention and of the at least difunctional polyisocyanates may take place, in an extruder, at the same location or else at different locations, preferably in unpressurized zones. It is beneficial for the at least difunctional polyisocyanates to be added in finely divided form to the hydroxyl-functionalized polyurethane hotmelt prepolymer according to the invention, such as in the form of an aerosol or fine droplets, for example.

The hydroxyl-functionalized polyurethane hotmelt prepolymer according to the invention may also be heated in a two-component mixing and metering system and be conveyed in the melted state, as component A, with heating, while the at least difunctional polyisocyanates are conveyed as component B. Continuous mixing then takes place in a dynamic mixing head or, preferably, in a static mixing tube, or in a combination of dynamic and static mixing methods.

Optionally, during the continuous mixing of the hydroxyl-functionalized polyurethane hotmelt prepolymer according to the invention, in the melt, with one or more at least difunctional polyisocyanates, further formulating constituents may be admixed, such as, for example, fillers, microbeads, resins, especially tackifying hydrocarbon resins, plasticizers, aging inhibitors (antioxidants), light stabilizers, UV absorbers, rheological additives, and also other auxiliaries and adjuvants.

During and after the continuous mixing of the hydroxyl-functionalized polyurethane hotmelt prepolymer according to the invention, in the melt, with one or more at least difunctional polyisocyanates, the chemical reaction to form the crosslinked polyurethane progresses continuously. Without catalysis or with moderate catalysis with a suitable catalyst, the reaction rate is sufficiently slow to allow thermoplastic processing for some period of time. During this time, which is generally in the region of minutes, the warm or hot, chemically reacting mixture may be shaped continuously to form a film. After shaping has taken place, the film is cooled to room temperature, which causes it to solidify immediately, independently of the progress of the chemical crosslinking reaction. Even at room temperature, the crosslinking reaction progresses further until completeness is reached. At room temperature, the chemical crosslinking reaction is concluded completely after, in general, one to two weeks. Following complete reaction, the resulting polymer is generally crosslinked to such an extent that it is no longer meltable.

The continuous shaping of the warm or hot, chemically reacting mixture takes place preferably by means of roll application or by means of an extrusion die, but may also take place with other application methods, such as, for example, a comma bar. The shaped film is applied continuously to an incoming web of carrier material, and is subsequently wound up. The incoming web of carrier material may be, for example, an antiadhesively treated film or an antiadhesively treated paper. Alternatively it may be a material already coated with a pressure-sensitive adhesive or with a functional layer, or may be a carrier, or may be any desired combinations of the stated web materials.

Since the hydroxyl-functionalized polyurethane hotmelt prepolymer according to the invention already contains branches, the skilled person must accept that, following metered addition of the polyisocyanate to this prepolymer in the melt, in other words at temperatures well above room temperature, immediate gelling begins, i.e., immediately, crosslinked structures are formed which make it impossible to carry out further mixing and subsequent coating and shaping to form the film. The fact that this does not occur was unforeseeable to the skilled person.

Since, as a result of hotmelt coating, the windability of the film is not tied to the progress of a chemical reaction or to the rate of evaporation of a solvent, but instead only to the speed with which the film cools, it is possible to attain very high coating speeds, and this constitutes an economic advantage. Moreover, there are no costs incurred for heating a heating tunnel section or for solvent incineration or solvent recovery. Since the hydroxyl-functionalized polyurethane hotmelt prepolymer of the invention can be prepared solventlessly, there are no costs incurred there either for solvent incineration or recovery.

As a result of the possibility of absence of solvent, it is possible in principle to produce polymer films of any desired thickness, without foaming or bubbling due to evaporating solvent.

With the process of the invention it is possible in particular to produce very homogeneous (homogeneously crosslinked) thick layers and homogeneously crosslinked three-dimensional shaped structures. Homogeneous layer thicknesses of more than 100 μm, even more than 200 μm, can be produced outstandingly.

The process set out above is suitable especially for producing viscoelastic adhesive tapes (single-layer constructions or else multilayer constructions, with two or three layers, for instance) having layer thicknesses of between 100 μm and 10 000 μm, preferably between 200 μm and 5000 μm, more preferably between 300 μm and 2500 μm.

Since the continuous admixing of the polyisocyanate or polyisocyanates that bring about chemical crosslinking to the hydroxyl-functionalized polyurethane hotmelt prepolymer of the invention only takes place shortly before the shaping of the mixture to form the film, there is no need for blocking of reactive groups, and hence no need to use blocking agents. Accordingly, at no point in time is there release of blocking agents remaining in the film that might possibly be disruptive in the subsequent application.

The hydroxyl-functionalized polyurethane hotmelt prepolymer according to the invention may also be stored or prepared in a solvent or a solvent mixture. In a solvent or solvent mixture it may also be reacted with one or more polyisocyanates and coated from solution during the beginning of the reaction phase between the prepolymer and the polyisocyanates. Examples of suitable solvents are methyl ethyl ketone, acetone, butyl acetate, decalin or tetrahydrofuran.

Since the crosslinking is not initiated from the outside by radiation, such as UV or EBC radiation, for example, a polymer structure with consistently homogeneous properties is achieved even when the film produced is very thick or when the film includes sizeable amounts of fillers. Fillers can be incorporated in sizeable amounts of, for example, 50% or more.

As a result of the fact that, as a general rule, the weight-average molar mass of the hydroxyl-functionalized polyurethane hotmelt prepolymer according to the invention is low by comparison with numerous other thermoplastically processable polymers, it can be melted and processed thermoplastically at comparatively low temperatures. During and after the shaping of the melt to form a film, there are, as a general rule, no technically relevant differences in the film in longitudinal and transverse directions.

Surprisingly and also unforeseeably for the skilled person, the branching of the hydroxyl-functionalized polyurethane hotmelt prepolymer of the invention allows the generation of crosslinked polymer structures having fractions that are flowable at the same time. Polymer structures of this kind result in viscoelastic properties of the type required in the adhesive-tape sector in order to obtain high bond strengths in conjunction with high shear strengths. A certain degree of viscous flow is always necessary, as is known, for developing adhesion to substrates to be bonded. Likewise, a certain degree of elastic resilience forces (cohesion) is necessary in order to be able to withstand shearing stresses, especially under hot conditions. Advantageous pressure-sensitive adhesion properties can be obtained not only when the layer of pressure-sensitive adhesive is designed with corresponding viscoelasticity, but also when this applies in respect of the other layers of an adhesive tape, such as the carrier layer or a primer layer, for example. Unbranched hotmelt prepolymers, on the other hand, after crosslinking, result either in polymer structures having a particularly elastic character, without significant flowable fractions, or else in polymer structures having very high flowable fractions and very low elastic fractions. A degree suitable for PSA applications could not be adequately achieved in this way. Polymers with too elastic a character flow onto substrates only to a very low degree, and, hence develop only low adhesion forces. Where unbranched hotmelt prepolymers, in turn, are crosslinked only slightly or not at all, therefore, they have too low an elastic character, and result in very low cohesion forces.

The hydroxyl-functionalized polyurethane hotmelt prepolymer of the invention can also be crosslinked advantageously with isocyanates that are only difunctional.

The invention is to be described in more detail with reference to the following examples, without wishing thereby to restrict the invention.

The test methods below were used in order briefly to characterize the specimens produced in accordance with the invention:

Dynamic Mechanical Analysis (DMA) for Determining the Storage Modulus G' and the Loss Modulus G"

For characterizing the hydroxyl-functionalized polyurethane hotmelt prepolymers, determinations of the storage modulus G' and of the loss modulus G" were made by means of Dynamic Mechanical Analysis (DMA).

The measurements were made using the shear stress-controlled rheometer DSR 200 N from Rheometric Scientific in an oscillation experiment with a sinusoidally oscillating shearing stress in a plate/plate arrangement. The storage modulus G' and the loss modulus G" were determined in a frequency sweep from $10^{-1}$ to $10^2$ rad/sec at a temperature of 25° C. G' and G" are defined as follows:

$G'=\tau/\gamma \cdot \cos(\delta)$ ($\tau$=shear stress, $\gamma$=deformation, $\delta$=phase angle=phase shift between shear stress vector and deformation vector).

$G''=\tau/\gamma \cdot \sin(\delta)$ ($\tau$=shear stress, $\gamma$=deformation, $\delta$=phase angle=phase shift between shear stress vector and deformation vector).

The definition of angular frequency is as follows: $\omega=2\pi \cdot f$ (f=frequency). The unit is rad/sec.

The thickness of the samples measured was always between 0.9 and 1.1 mm (1±0.1 mm). The sample diameter was in each case 25 mm. Pre-tensioning took place with a load of 3N. For all of the measurements, the stress of the sample bodies was 2500 Pa.

Dynamic Mechanical Analysis (DMA) for Determining the Complex Viscosity ($\eta^*$)

For characterizing the hydroxyl-functionalized polyurethane hotmelt prepolymers, determinations of the complex viscosity were made by means of Dynamic Mechanical Analysis (DMA).

The measurements were made using the shear stress-controlled rheometer DSR 200 N from Rheometric Scientific in an oscillation experiment with a sinusoidally oscillating shearing stress in a plate/plate arrangement. The complex viscosity was determined in a temperature sweep from −50° C. to +250° C. with an oscillation frequency of 10 rad/s. The complex viscosity $\eta^*$ is defined as follows: $\eta^*=G^*/\omega$ ($G^*$=complex shear modulus, $\omega$=angular frequency).

The further definitions are as follows: $G^* = \sqrt{(G')^2 + (G'')^2}$ ($G''$=viscosity modulus (loss modulus), $G'$=elasticity modulus (storage modulus)).

$G'' = \tau/\gamma \cdot \sin(\delta)$ ($\tau$=shear stress, $\gamma$=deformation, $\delta$=phase angle=phase shift between shear stress vector and deformation vector).

$G' = \tau/\gamma \cdot \cos(\delta)$ ($\pi$=shear stress, $\gamma$=deformation, $\delta$=phase angle=phase shift between shear stress vector and deformation vector).

$\omega = 2\pi \cdot f$ (f=frequency).

The thickness of the samples measured was always between 0.9 and 1.1 mm (1±0.1 mm). The sample diameter was in each case 25 mm. Pre-tensioning took place with a load of 3N. For all of the measurements, the stress of the sample bodies was 2500 Pa.

Determining the Tensile Properties in a Tensile Strain Test

After a storage time of two weeks at room temperature, the samples, with a thickness of 0.9 to 1.1 mm, were investigated in longitudinal direction (shaping direction) and in transverse direction (direction at an angle of 90° relative to the shaping direction in the film plane) in respect of their tensile strain properties.

The measurements took place in accordance with DIN EN ISO 527-1 to 3 on the standard test specimens of size 5A with a testing speed of 300 mm/min. The tensile strength and the associated strain were measured. The tensile strength is the maximum force measured on strain of the test material, divided by the initial cross-sectional area of the sample, and is reported in the units $N/mm^2$. The strain at the tensile strength is the change in length, relative to the original measured length of the test strip, at the maximum measured force, and is reported in the units %.

Determining the Relaxation Behavior

After a storage time of two weeks at room temperature, the samples, with a thickness of 0.9 to 1.1 mm, were investigated in longitudinal direction (shaping direction) and in transverse direction (direction at an angle of 90° relative to the shaping direction in the film plane) in respect of their relaxation behavior. The investigations of the relaxation behavior were likewise made in a tensile strain test in accordance with DIN EN ISO 527-1 to 3 using standard test specimens of size 5A. At a testing speed of 100 mm/min, the test material was stretched 50% in the longitudinal direction, relative to the original length of the test strip. The associated stress was measured at the moment the strain reached 50%. The stress is defined as the tensile force on the sample body, relative to the initial cross-sectional area within the measured length. The strain of 50% was maintained further. After a time of five minutes, the stress was determined again. The percentage decrease in the stress is the relaxation:

relaxation=100×(initial stress−final stress)/initial stress.

Gel Permeation Chromatography (GPC)

In order to characterize the hydroxyl-functionalized polyurethane hotmelt prepolymers, determinations of the number-average and weight-average molar masses were made by means of gel permeation chromatography (GPC). The measurements were performed at the premises of the Polymer Standards Service company in Mainz.

Calibration took place universally with poly(methyl methacrylate). The determinations were made in accordance with analytical method AM 1005. The eluent used was THF/0.1% by volume trifluoroacetic acid (TFAc). The preliminary column used was PSS-SDV, 10 µm, ID 8.0 mm×50 mm, and the column used was PSS-SDV, 10 µm linear one, ID 8.0 mm×300 mm. A TSP P 100 was used for pumping. The flow rate was 0.5 ml/min. The sample concentration was around 1.5 g/l. The injection system was a TSP AS 3000. The injection volume was 100 µl. Measurement took place at 23° C. The detector was a Shodex RI 71. Evaluation was made using the program PSS-WinGPC Unity Version 7.20.

Bond Strength

The bond strength was determined in accordance with PSTC-101. According to this method, the adhesive strip for measurement was applied to the substrate (steel), pressed on twice with a 2 kg weight and then peeled off under defined conditions by means of a tensile testing machine. The peel angle was 90° or 180°, the peel speed 300 mm/min. The force required for peel removal is the bond strength, which is reported in the units N/cm. The adhesive strips measured were backed for reinforcement with a 25 µm polyester film.

Shear Test

The shear test was carried out in accordance with test specification PSTC-107. According to this method, the adhesive strip for measurement was applied to the substrate (steel), pressed on four times using a 2 kg weight, and then exposed to a constant shearing load. The holding time is ascertained, in minutes.

The bond area was in each case 13×20 $mm^2$. The shearing load on this bond area was 1 kg. Measurement was carried out at room temperature (23° C.). The adhesive strips measured were backed for reinforcement with a 25 µm polyester film.

The hydroxyl-functionalized polyurethane hotmelt prepolymers were manufactured in a customary heatable and evacuable mixing vessel with dissolver stirrer mechanism, from the company Molteni. During the mixing operation, which lasted about two hours in each case, the temperature of the mixture was adjusted to about 70° C. to 100° C. In those cases where no solvent was used, vacuum was applied in order to degas the components.

The reaction of the hydroxyl-functionalized polyurethane hotmelt prepolymers according to the invention with one or more polyisocyanates took place, in those cases where the hydroxyl-functionalized polyurethane hotmelt prepolymer was used in its function as a hotmelt, in a twin-screw extruder from the company Leistritz, Germany, ref. LSM 30/34. The assembly was heated electrically from the outside to about 70° C. to 90° C. and was air-cooled via a variety of fans, and was designed so as to ensure effective mixing of prepolymer and polyisocyanate with a short residence time in the extruder. For this purpose, the mixing screws of the twin-screw extruder were arranged such that conveying elements alternated with mixing elements. The respective polyisocyanate was added with suitable metering equipment, using metering assistants, into the unpressurized conveying zones of the twin-screw extruder.

After the chemically reacting mixture, with a temperature of around 80° C., had emerged from the twin-screw extruder (exit: circular die 5 mm in diameter), its shaping to a film took place directly by means of a downstream two-roll applicator unit, between two incoming, double-sidedly siliconized, 50 µm polyester films. The feed rate was varied between 1 m/min and 20 m/min. After the film had cooled and therefore solidified, one of the incoming, double-sidedly siliconized polyester films was immediately removed again. This then gave a windable film.

Some of the films wound onto siliconized polyester film were unwound again after a two-week storage period at room temperature, and laminated to the pressure-sensitive poly-acrylate adhesive Durotac 280-1753 from the company National Starch, which was present in the form of an adhesive ready-coated out in a thickness of 50 µm onto siliconized polyester film. The lamination took place without further pretreatment. The experiments with the polyacrylate PSA served to test out its use as a carrier layer or as a functional layer in an adhesive tape.

In some of the experiments, the hydroxyl-functionalized polyurethane hotmelt prepolymers according to the invention were dissolved in acetone before being used. The fraction of acetone was always 40% by weight. The reaction of the hydroxyl-functionalized polyurethane hotmelt prepolymers according to the invention with one or more polyisocyanates then took place in a customary, heatable and evacuable mixing vessel with dissolver stirrer mechanism, from the company Molteni, at room temperature. The mixing time was 15 to 30 minutes. A chemically reacting mixture of this kind, comprising a hydroxyl-functionalized polyurethane hotmelt prepolymer with one or more polyisocyanates, in acetone, was coatable for approximately 24 to 48 hours in general, with catalyst levels of between 0.05% and 0.2%, until gradual gelling occurred.

Table 1 lists the base materials used for producing the chemically crosslinked polyurethane film, in each case with trade name and manufacturer. The stated raw materials are all freely available commercially.

TABLE 1

Base materials used to produce the chemically crosslinked polyurethane films

| Trade name | Chemical basis | Number-average molar mass $M_n$ (g/mol) | OH or NCO number (mmol OH/kg or mmol NCO/kg) | Manufacturer/supplier |
|---|---|---|---|---|
| Voranol P400 ® | Polypropylene glycol, diol | 400 | 4643 | Dow |
| Voranol 1010L ® | Polypropylene glycol, diol | 1000 | 1961 | Dow |
| Voranol 2000L ® | Polypropylene glycol, diol | 2000 | 989 | Dow |
| Voranol CP 1055 ® | Polypropylene glycol, triol | 1000 | 2781 | Dow |
| Voranol CP 3355 ® | Polypropylene glycol, triol | 3500 | 847 | Dow |
| Voranol CP 6055 ® | Polypropylene glycol, triol | 6000 | 491 | Dow |
| MPDiol ® | 2-Methyl-1,3-propanediol | 90.12 | 22 193 | Lyondell |
| Ethylene glycol | Ethylene glycol | 62.07 | 32 222 | Aldrich |
| Lutensol AO7 ® | Ethoxylated $C_{13}C_{15}$ oxo-process alcohol | 520 | 1961 | BASF |
| Vestanat IPDI ® | Isophorone diisocyanate (IPDI) | 222.3 | 8998 | Degussa |
| Desmodur W ® | Dicyclohexylmethane diisocyanate (HMDI) | 262 | 7571 | Bayer |
| Tinuvin 292 ® | Sterically hindered amine, light stabilizer and aging inhibitor | | | Ciba |
| Tinuvin 400 ® | Triazine derivative, UV protectant | | | Ciba |
| Coscat 83 ® | Bismuth trisneodecanoate CAS No. 34364-26-6 | | | Caschem |
| Mark DBTL ® | Dibutyltin dilaurate | | | Nordmann, Rassmann |
| Aerosil R 202 ® | Fumed silica, hydrophobicized | | | Evonik |
| Expancel 092 | Pre-expanded microspheres, | | | Akzo Nobel |

TABLE 1-continued

Base materials used to produce the chemically crosslinked polyurethane films

| Trade name | Chemical basis | Number-average molar mass $M_n$ (g/mol) | OH or NCO number (mmol OH/kg or mmol NCO/kg) | Manufacturer/supplier |
|---|---|---|---|---|
| DETX 100 d25 ® | average particle size 100 μm, density: 25 kg/m³ | | | |

EXAMPLES

Example 1

The hydroxyl-functionalized polyurethane hotmelt prepolymer was prepared by homogeneously mixing and therefore chemically reacting the following starting materials in the proportions specified:

TABLE 2

Composition of the hydroxyl-functionalized polyurethane hotmelt prepolymer, Example 1

| Starting material | Weight fraction (% by weight) | Percentage ratio of the number of OH groups to one another | Percentage ratio of the number of molecules carrying OH groups to one another (idealized)* | Percentage ratio of the number of all functionalized molecules to one another (idealized)* |
|---|---|---|---|---|
| Voranol P400 | 21.7 | 42.0 | 43.4 | 22.5 |
| Voranol CP 6055 | 48.9 | 10.0 | 6.9 | 3.6 |
| MP Diol | 5.2 | 48.0 | 49.7 | 25.7 |
| Coscat 83 | 0.1 | | | |
| Vestanat IPDI | 24.1 | | | 48.2 |
| Total | 100.0 | 100.0 | 100.0 | 100.0 |

*calculated from the weight fractions and the OH numbers or NCO numbers of the starting materials, under the highly idealized assumption that the Voranol P400 has a functionality of exactly 2, and the Voranol CP 6055 has a functionality of exactly 3.

To start with, all of the starting materials listed, apart from the MP Diol and the Vestanat IPDI, were mixed at a temperature of 70° C. and a pressure of 100 mbar for 1.5 hours. The MP Diol was then mixed in for 15 minutes, and subsequently the Vestanat IPDI, likewise over a time of 15 minutes. As a result of the heat of reaction produced, the mixture underwent heating to 100° C., and was then dispensed into storage containers.

The NCO/OH ratio was 0.90. The theoretical gel point is calculated as 0.91. 10.0% of the hydroxyl groups introduced to form the hydroxyl-functionalized polyurethane hotmelt prepolymer originate from a polypropylene glycol having a functionality of more than two and a number-average molar mass of 6000 g/mol. Accordingly around 6.9% of the starting-material molecules carrying OH groups are trifunctional. Overall, in an idealized consideration, 3.6% of the molecules participating in the molecular construction of the hydroxyl-functionalized polyurethane hotmelt prepolymer are trifunctional and hence capable of forming branched structures.

96.4% of the molecules participating in the molecular construction of the hydroxyl-functionalized polyurethane hotmelt prepolymer have a relative molar mass of less than or equal to 1000 (in an idealized consideration).

The resulting prepolymer was solid at room temperature and in terms of consistency was rubberlike and tacky (pressure-sensitively adhesive). The complex viscosity η* at room temperature (23° C.) was 18 000 Pas and at 70° C. was 210 Pas.

The weight-average molar mass $M_w$ was 120 000 g/mol, the number-average molar mass $M_n$ was 17 600 g/mol.

The resulting prepolymer was meltable.

For some of the experiments the prepolymer was dissolved in acetone.

Use:

To produce a film of pressure-sensitive adhesive (PSA), the prepolymer in solution in acetone was coated at room temperature onto a polyester film 25 μm thick. The solvent was evaporated at 70° C. This gave a layer 50 μm thick.

For producing a chemically crosslinked PSA, the prepolymer in solution in acetone was mixed at room temperature with Vestanat IPDI. The mixing ratio was 100 parts by weight prepolymer: 3.99 parts by weight Vestanat IPDI. The total NCO/OH ratio of all of the NCO and OH groups introduced up to that point was therefore 1.05. The mixture was coated onto a polyester film 25 μm thick. The solvent was evaporated at 70° C. This gave a layer 50 μm thick.

For producing a chemically crosslinked adhesive-tape carrier, the prepolymer was supplied continuously to a twin-screw extruder preheated to 80° C. The polyisocyanate was metered into the twin-screw extruder continuously at the same and at the same location. The metered polyisocyanate used was Desmodur W (dicyclohexylmethane diisocyanate).

Again, a total NCO/OH ratio of 1.05 was set.

The mixing ratios were therefore as follows:

100 parts by weight prepolymer: 4.54 parts by weight Desmodur W.

Mixing and conveying were carried out continuously. The time taken for the extrudate to depart from the extruder was around two minutes.

The extrudate was supplied directly to a two-roll applicator, where it was coated between two incoming, double-sidedly siliconized polyester films and thereby shaped to form a film. The thickness of the film was 1.0 mm. After cooling to room temperature and following removal of one of the two siliconized polyester films, the film was wound up. The wound film was stored at room temperature for two weeks.

It was then partly unwound again and laminated to the polyacrylate PSA Durotac 280-1753 from National Starch, present in a form ready-coated onto siliconized polyester film in a thickness of 50 μm. Lamination took place without any pretreatment at all. The experiments with the polyacrylate PSA were used to test out its use as a carrier layer or as a functional layer in an adhesive tape.

The test results (Example 1) are summarized in the table below:

TABLE 3

Test results, Example 1

| | Hydroxyl-functionalized polyurethane hotmelt prepolymer | Prepolymer after reaction (crosslinking) in solution with IPDI | Prepolymer after reaction (crosslinking) in the melt with Desmodur W | Prepolymer after crosslinking and lamination to the polyacrylate PSA Durotac 280-1753 |
|---|---|---|---|---|
| G' (at 1 rad/sec and 25° C.) (Pa) | 11 000 | 110 000 | 120 000 | |
| G" (at 1 rad/sec and 25° C.) | 30 000 | 90 000 | 90 000 | |
| G' (at 10 rad/sec and 25° C.) | 80 000 | 320 000 | 360 000 | |
| G" (at 10 rad/sec and 25° C.) | 140 000 | 190 000 | 200 000 | |
| Tensile strength, longitudinal (N/mm²) | 0.1 | 0.9 | 1.2 | |
| Tensile strength, transverse (N/mm²) | 0.1 | 0.9 | 1.2 | |
| Strain, longitudinal (%) | >1000 | 630 | 580 | |
| Strain, transverse (%) | >1000 | 670 | 570 | |
| Relaxation, longitudinal (%) | >90 | 55 | 51 | |
| Relaxation, transverse (%) | >90 | 57 | 50 | |
| Bond strength, steel, 300 mm/min (N/cm) | 11.6 (peel angle: 180°) | 5.3 (peel angle: 180°) | 4.8 (peel angle: 180°) | 18.3 (peel angle: 90°) |
| Holding time in the shear test at room temperature, 1 kg load (min) | 11 | 7500 | >10 000 | >10 000 |

For comparison, the bond strength of the PSA Durotac 280-1753, applied as a layer 50 μm thick to a polyester film 25 μm thick, was 5.9 N/cm.

Example 2

The hydroxyl-functionalized polyurethane hotmelt prepolymer was prepared by homogeneously mixing and therefore chemically reacting the following starting materials in the proportions specified:

TABLE 4

Composition of the hydroxyl-functionalized polyurethane hotmelt prepolymer, Example 2

| Starting material | Weight fraction (% by weight) | Percentage ratio of the number of OH groups to one another | Percentage ratio of the number of molecules carrying OH groups to one another (idealized)* | Percentage ratio of the number of all functionalized molecules to one another (idealized)* |
|---|---|---|---|---|
| Voranol P400 | 50.8 | 87.8 | 88.5 | 44.8 |

TABLE 4-continued

Composition of the hydroxyl-functionalized polyurethane hotmelt prepolymer, Example 2

| Starting material | Weight fraction (% by weight) | Percentage ratio of the number of OH groups to one another | Percentage ratio of the number of molecules carrying OH groups to one another (idealized)* | Percentage ratio of the number of all functionalized molecules to one another (idealized)* |
|---|---|---|---|---|
| Voranol CP 6055 | 13.6 | 2.5 | 1.7 | 0.8 |
| MP Diol | 1.2 | 9.7 | 9.8 | 5.0 |
| Coscat 83 | 0.1 | | | |
| Desmodur W | 34.3 | | | 49.4 |
| Total | 100.0 | 100.0 | 100.0 | 100.0 |

*calculated from the weight fractions and the OH numbers or NCO numbers of the starting materials, under the highly idealized assumption that the Voranol P400 has a functionality of exactly 2, and the Voranol CP 6055 has a functionality of exactly 3.

To start with, all of the starting materials listed, apart from the MP Diol and the Desmodur W, were mixed at a temperature of 70° C. and a pressure of 100 mbar for 1.5 hours. The MP Diol was then mixed in for 15 minutes, and subsequently the Desmodur W, likewise over a time of 15 minutes. As a result of the heat of reaction produced, the mixture underwent heating to 100° C., and was then dispensed into storage containers.

The NCO/OH ratio was 0.97. The theoretical gel point is calculated as 0.98. 2.5% of the hydroxyl groups introduced to form the hydroxyl-functionalized polyurethane hotmelt prepolymer originate from a polypropylene glycol having a functionality of more than two and a number-average molar mass of 6000 g/mol. Accordingly around 1.7% of the starting-material molecules carrying OH groups are trifunctional. Overall, in an idealized consideration, 0.8% of the molecules participating in the molecular construction of the hydroxyl-functionalized polyurethane hotmelt prepolymer are trifunctional and hence capable of forming branched structures. 99.2% of the molecules participating in the molecular construction of the hydroxyl-functionalized polyurethane hotmelt prepolymer have a relative molar mass of less than or equal to 1000 (in an idealized consideration).

The resulting prepolymer was solid at room temperature and in terms of consistency was rubberlike and tacky (pressure-sensitively adhesive). The complex viscosity $\eta^*$ at room temperature (23° C.) was 54 000 Pas and at 70° C. was 265 Pas.

The weight-average molar mass $M_w$ was 100 000 g/mol, the number-average molar mass $M_n$ was 15 600 g/mol.

The resulting prepolymer was meltable.

For some of the experiments the prepolymer was dissolved in acetone.

Use:

To produce a film of pressure-sensitive adhesive (PSA), the prepolymer in solution in acetone was coated at room temperature onto a polyester film 25 μm thick. The solvent was evaporated at 70° C. This gave a layer 50 μm thick.

For producing a chemically crosslinked PSA, the prepolymer in solution in acetone was mixed at room temperature with Vestanat IPDI. The mixing ratio was 100 parts by weight prepolymer: 2.51 parts by weight Vestanat IPDI. The total NCO/OH ratio of all of the NCO and OH groups introduced up to that point was therefore 1.05. The mixture was coated onto a polyester film 25 μm thick. The solvent was evaporated at 70° C. This gave a layer 50 μm thick.

For producing a chemically crosslinked adhesive-tape carrier, the prepolymer was supplied continuously to a twin-screw extruder preheated to 80° C. The polyisocyanate was metered into the twin-screw extruder continuously at the same and at the same location. The metered polyisocyanate used was Vestanat IPDI.

Again, a total NCO/OH ratio of 1.05 was set.

The mixing ratios were therefore again as follows:

100 parts by weight prepolymer: 2.51 parts by weight Vestanat IPDI.

Mixing and conveying were carried out continuously. The time taken for the extrudate to depart from the extruder was around two minutes.

The extrudate was supplied directly to a two-roll applicator, where it was coated between two incoming, double-sidedly siliconized polyester films and thereby shaped to form a film. The thickness of the film was 1.0 mm. After cooling to room temperature and following removal of one of the two siliconized polyester films, the film was wound up. The wound film was stored at room temperature for two weeks.

It was then partly unwound again and laminated to the polyacrylate PSA Durotac 280-1753 from National Starch, present in a form ready-coated onto siliconized polyester film in a thickness of 50 μm. Lamination took place without any pretreatment at all. The experiments with the polyacrylate PSA were used to test out its use as a carrier layer or as a functional layer in an adhesive tape.

The test results (Example 2) are summarized in the table below:

TABLE 5

Test results, Example 2

| | Hydroxyl-functionalized polyurethane hotmelt prepolymer | Prepolymer after reaction (crosslinking) in solution with IPDI | Prepolymer after reaction (crosslinking) in the melt with IPDI | Prepolymer after crosslinking and lamination to the polyacrylate PSA Durotac 280-1753 |
|---|---|---|---|---|
| G' (at 1 rad/sec and 25° C.) (Pa) | 50 000 | 370 000 | 390 000 | |
| G" (at 1 rad/sec and 25° C.) | 110 000 | 320 000 | 320 000 | |
| G' (at 10 rad/sec and 25° C.) | 270 000 | 610 000 | 650 000 | |
| G" (at 10 rad/sec and 25° C.) | 400 000 | 450 000 | 520 000 | |
| Tensile strength, longitudinal (N/mm²) | 0.1 | 1.4 | 1.6 | |
| Tensile strength, transverse (N/mm²) | 0.1 | 1.3 | 1.4 | |
| Strain, longitudinal (%) | >1000 | 800 | 630 | |
| Strain, transverse (%) | >1000 | 670 | 650 | |
| Relaxation, longitudinal (%) | >90 | 48 | 51 | |
| Relaxation, transverse (%) | >90 | 49 | 50 | |

TABLE 5-continued

Test results, Example 2

|  | Hydroxyl-functionalized polyurethane hotmelt prepolymer | Prepolymer after reaction (cross-linking) in solution with IPDI | Prepolymer after reaction (cross-linking) in the melt with IPDI | Prepolymer after cross-linking and lamination to the polyacrylate PSA Durotac 280-1753 |
|---|---|---|---|---|
| Bond strength, steel, 300 mm/min (N/cm) | 12.8 (peel angle: 180°) | 5.9 (peel angle: 180°) | 4.9 (peel angle: 180°) | 34.7 (peel angle: 90°) |
| Holding time in the shear test at room temperature, 1 kg load (min) | 16 | 350 | 800 | 900 |

For comparison, the bond strength of the PSA Durotac 280-1753, applied as a layer 50 μm thick to a polyester film 25 μm thick, was 5.9 N/cm.

Example 3

The hydroxyl-functionalized polyurethane hotmelt prepolymer was prepared by homogeneously mixing and therefore chemically reacting the following starting materials in the proportions specified:

TABLE 6

Composition of the hydroxyl-functionalized polyurethane hotmelt prepolymer, Example 3

| Starting material | Weight fraction (% by weight) | Percentage ratio of the number of OH groups to one another | Percentage ratio of the number of molecules carrying OH groups to one another (idealized)* | Percentage ratio of the number of all functionalized molecules to one another (idealized)* |
|---|---|---|---|---|
| Voranol 1010L | 11.1 | 8.0 | 8.1 | 4.1 |
| Voranol CP 3355 | 6.4 | 2.0 | 1.3 | 0.7 |
| Voranol P400 | 52.8 | 90.0 | 90.6 | 45.5 |
| Mark DBTL | 0.1 |  |  |  |
| Vestanat IPDI | 29.6 |  |  | 49.7 |
| Total | 100.0 | 100.0 | 100.0 | 100.0 |

*calculated from the weight fractions and the OH numbers or NCO numbers of the starting materials, under the highly idealized assumption that the Voranol 1010L and the Voranol P400 have a functionality of exactly 2, and the Voranol CP 3355 has a functionality of exactly 3.

To start with, all of the starting materials listed, apart from the Vestanat IPDI, were mixed at a temperature of 70° C. and a pressure of 100 mbar for 1.5 hours. Then the Vestanat IPDI was then mixed in over a time of 15 minutes. As a result of the heat of reaction produced, the mixture underwent heating to 100° C., and was then dispensed into storage containers.

The NCO/OH ratio was 0.98. The theoretical gel point is calculated as 0.98. 2.0% of the hydroxyl groups introduced to form the hydroxyl-functionalized polyurethane hotmelt prepolymer originate from a polypropylene glycol having a functionality of more than two and a number-average molar mass of 3500 g/mol. Accordingly around 1.3% of the starting-material molecules carrying OH groups are trifunctional.

Overall, in an idealized consideration, 0.7% of the molecules participating in the molecular construction of the hydroxyl-functionalized polyurethane hotmelt prepolymer are trifunctional and hence capable of forming branched structures. 99.3% of the molecules participating in the molecular construction of the hydroxyl-functionalized polyurethane hotmelt prepolymer have a relative molar mass of less than or equal to 1000 (in an idealized consideration).

The resulting prepolymer was solid at room temperature and in terms of consistency was rubberlike and tacky (pressure-sensitively adhesive). The complex viscosity η* at room temperature (23° C.) was 36 000 Pas and at 70° C. was 95 Pas.

The weight-average molar mass $M_w$ was 99 000 g/mol, the number-average molar mass $M_n$ was 13 600 g/mol.

The resulting prepolymer was meltable.

For some of the experiments the prepolymer was dissolved in acetone.

Use:

To produce a film of pressure-sensitive adhesive (PSA), the prepolymer in solution in acetone was coated at room temperature onto a polyester film 25 μm thick. The solvent was evaporated at 70° C. This gave a layer 50 μm thick.

For producing a chemically crosslinked PSA, the prepolymer in solution in acetone was mixed at room temperature with Desmodur W. The mixing ratio was 100 parts by weight prepolymer: 2.16 parts by weight Desmodur W. The total NCO/OH ratio of all of the NCO and OH groups introduced up to that point was therefore 1.05. The mixture was coated onto a polyester film 25 μm thick. The solvent was evaporated at 70° C. This gave a layer 50 μm thick.

For producing a chemically crosslinked adhesive-tape carrier, the prepolymer was supplied continuously to a twin-screw extruder preheated to 80° C. The polyisocyanate was metered into the twin-screw extruder continuously at the same and at the same location. The metered polyisocyanate used was Desmodur W.

Again, a total NCO/OH ratio of 1.05 was set.

The mixing ratios were therefore again as follows:

100 parts by weight prepolymer: 2.16 parts by weight Desmodur W.

Mixing and conveying were carried out continuously. The time taken for the extrudate to depart from the extruder was around two minutes.

The extrudate was supplied directly to a two-roll applicator, where it was coated between two incoming, double-sidedly siliconized polyester films and thereby shaped to form a film. The thickness of the film was 1.0 mm. After cooling to room temperature and following removal of one of the two siliconized polyester films, the film was wound up. The wound film was stored at room temperature for two weeks.

It was then partly unwound again and laminated to the polyacrylate PSA Durotac 280-1753 from National Starch, present in a form ready-coated onto siliconized polyester film in a thickness of 50 μm. Lamination took place without any pretreatment at all. The experiments with the polyacrylate PSA were used to test out its use as a carrier layer or as a functional layer in an adhesive tape.

The test results (Example 3) are summarized in the table below:

TABLE 7

Test results, Example 3

| | Hydroxyl-functionalized polyurethane hotmelt prepolymer | Prepolymer after reaction (cross-linking) in solution with Desmodur W | Prepolymer after reaction (cross-linking) in the melt with Desmodur W | Prepolymer after cross-linking and lamination to the polyacrylate PSA Durotac 280-1753 |
|---|---|---|---|---|
| G' (at 1 rad/sec and 25° C.) (Pa) | 9000 | 90 000 | 100 000 | |
| G" (at 1 rad/sec and 25° C.) | 28 000 | 88 000 | 95 000 | |
| G' (at 10 rad/sec and 25° C.) | 65 000 | 250 000 | 270 000 | |
| G" (at 10 rad/sec and 25° C.) | 110 000 | 150 000 | 160 000 | |
| Tensile strength, longitudinal (N/mm$^2$) | <0.1 | 0.7 | 0.8 | |
| Tensile strength, transverse (N/mm$^2$) | <0.1 | 0.6 | 0.8 | |
| Strain, longitudinal (%) | >1000 | 400 | 450 | |
| Strain, transverse (%) | >1000 | 390 | 470 | |
| Relaxation, longitudinal (%) | >90 | 42 | 41 | |
| Relaxation, transverse (%) | >90 | 40 | 42 | |
| Bond strength, steel, 300 mm/min (N/cm) | 8.0 (peel angle: 180°) | 1.3 (peel angle: 180°) | 0.9 (peel angle: 180°) | 15.0 (peel angle: 90°) |
| Holding time in the shear test at room temperature, 1 kg load (min) | <1 | 260 | 250 | 320 |

For comparison, the bond strength of the PSA Durotac 280-1753, applied as a layer 50 μm thick to a polyester film 25 μm thick, was 5.9 N/cm.

Example 4

The hydroxyl-functionalized polyurethane hotmelt prepolymer was prepared by homogeneously mixing and therefore chemically reacting the following starting materials in the proportions specified:

TABLE 8

Composition of the hydroxyl-functionalized polyurethane hotmelt prepolymer, Example 4

| Starting material | Weight fraction (% by weight) | Percentage ratio of the number of OH groups to one another | Percentage ratio of the number of molecules carrying OH groups to one another (idealized)* | Percentage ratio of the number of all functionalized molecules to one another (idealized)* |
|---|---|---|---|---|
| Voranol P400 | 17.2 | 40 | 40.0 | 20.8 |
| Voranol CP 6055 | 34.9 | 8.6 | 5.8 | 3.0 |
| Ethylene glycol | 2.5 | 40 | 40.0 | 20.8 |
| Lutensol AO7 | 2.8 | 2.8 | 5.6 | 2.9 |
| Voranol 2000L | 17.3 | 8.6 | 8.6 | 4.6 |
| Tinuvin 400 | 0.6 | | | |
| Tinuvin 292 | 0.3 | | | |
| Coscat 83 | 0.1 | | | |
| Aerosil R 202 | 2.1 | | | |
| Expancel 092 DETX 100 d25 | 1.8 | | | |
| Vestanat IPDI | 20.4 | | | 47.9 |
| Total | 100.0 | 100.0 | 100.0 | 100.0 |

*calculated from the weight fractions and the OH numbers or NCO numbers of the starting materials, under the highly idealized assumption that the Voranol P400 and the Voranol 2000L have a functionality of exactly 2, and the Voranol CP 6055 has a functionality of exactly 3. For the Lutensol AO7, a functionality of 1 was assumed.

To start with, all of the starting materials listed, apart from the ethylene glycol and the Vestanat IPDI, were mixed at a temperature of 70° C. and a pressure of 100 mbar for 1.5 hours. Ethylene glycol was then mixed in for 15 minutes, and subsequently the Vestanat IPDI, over a time of 15 minutes. As a result of the heat of reaction produced, the mixture underwent heating to 100° C., and was then dispensed into storage containers.

The NCO/OH ratio was 0.92. The theoretical gel point is calculated as 0.92 when the Lutensol AO7 is not included in the calculation. 8.6% of the hydroxyl groups introduced to form the hydroxyl-functionalized polyurethane hotmelt prepolymer originate from a polypropylene glycol having a functionality of more than two and a number-average molar mass of 6000 g/mol. Accordingly around 5.8% of the starting-material molecules carrying OH groups are trifunctional. Overall, in an idealized consideration, 3.0% of the molecules participating in the molecular construction of the hydroxyl-functionalized polyurethane hotmelt prepolymer are trifunctional and hence capable of forming branched structures. 92.4% of the molecules participating in the molecular construction of the hydroxyl-functionalized polyurethane hotmelt prepolymer have a relative molar mass of less than or equal to 1000 (in an idealized consideration).

The resulting prepolymer was solid at room temperature and in terms of consistency was rubberlike and tacky (pressure-sensitively adhesive). The complex viscosity η* at room temperature (23° C.) was 75 000 Pas and at 70° C. was 650 Pas.

The weight-average molar mass $M_w$ was 130 000 g/mol, the number-average molar mass $M_n$ was 15 900 g/mol.

The resulting prepolymer was meltable.

Use:

The prepolymer this time was used exclusively for producing a chemically crosslinked, viscoelastic adhesive-tape carrier.

For this purpose it was supplied continuously to a twin-screw extruder preheated to 80° C.

The polyisocyanate was metered into the twin-screw extruder continuously at the same and at the same location. The metered polyisocyanate used was Vestanat IPDI.

A total NCO/OH ratio of 1.05 was set.

The mixing ratios were therefore as follows:

100 parts by weight prepolymer: 2.90 parts by weight Vestanat IPDI.

Mixing and conveying were carried out continuously. The time taken for the extrudate to depart from the extruder was around two minutes.

The extrudate was supplied directly to a two-roll applicator, where it was coated between two incoming, double-sidedly siliconized polyester films and thereby shaped to form a film. The thickness of the film was 1.0 mm. After cooling to room temperature and following removal of one of the two siliconized polyester films, the film was wound up. The wound film was stored at room temperature for two weeks.

It was then partly unwound again and laminated to the polyacrylate PSA Durotac 280-1753 from National Starch, present in a form ready-coated onto siliconized polyester film in a thickness of 50 μm. Lamination took place without any pretreatment at all. The experiments with the polyacrylate PSA were used to test out its use as a carrier layer or as a functional layer in an adhesive tape.

The test results (Example 4) are summarized in the table below:

TABLE 9

Test results, Example 4

| | Hydroxyl-functionalized polyurethane hotmelt prepolymer (film 1 mm thick) | Prepolymer after reaction (crosslinking) in the melt with Vestanat IPDI (film 1 mm thick) | Prepolymer after crosslinking and lamination to the polyacrylate PSA Durotac 280-1753 |
|---|---|---|---|
| G' (at 1 rad/sec and 25° C.) (Pa) | 11 000 | 100 000 | |
| G" (at 1 rad/sec and 25° C.) | 31 000 | 85 000 | |
| G' (at 10 rad/sec and 25° C.) | 95 000 | 270 000 | |
| G" (at 10 rad/sec and 25° C.) | 150 000 | 240 000 | |
| Tensile strength, longitudinal (N/mm$^2$) | 0.1 | 1.1 | |
| Tensile strength, transverse (N/mm$^2$) | 0.1 | 1.1 | |
| Strain, longitudinal (%) | >1000 | 770 | |
| Strain, transverse (%) | >1000 | 750 | |
| Relaxation, longitudinal (%) | 85 | 56 | |
| Relaxation, transverse (%) | 86 | 57 | |
| Bond strength, steel, 300 mm/min (N/cm) | 11.1 (peel angle: 90°) | 4.1 (peel angle: 90°) | 29.0 (peel angle: 90°) |
| Holding time in the shear test at room temperature, 1 kg load (min) | 13 | 6000 | >10 000 |

For comparison, the bond strength of the PSA Durotac 280-1753, applied as a layer 50 μm thick to a polyester film 25 μm thick, was 5.9 N/cm.

Comparative Example 1

A hydroxyl-functionalized polyurethane hotmelt prepolymer was prepared by homogeneously mixing and therefore chemically reacting the following starting materials in the proportions specified:

TABLE 10

Composition of the hydroxyl-functionalized polyurethane hotmelt prepolymer, Comparative Example 1

| Starting material | Weight fraction (% by weight) | Percentage ratio of the number of OH groups to one another | Percentage ratio of the number of molecules carrying OH groups to one another (idealized)* | Percentage ratio of the number of all functionalized molecules to one another (idealized)* |
|---|---|---|---|---|
| Voranol P400 | 36.3 | 42 | 43.5 | 22.5 |
| Voranol CP 1055 | 14.4 | 10 | 6.9 | 3.6 |
| MP Diol | 8.7 | 48 | 49.6 | 25.7 |
| Coscat 83 | 0.1 | | | |
| Vestanat IPDI | 40.5 | | | 48.2 |
| Total | 100.0 | 100.0 | 100.0 | 100.0 |

*calculated from the weight fractions and the OH numbers or NCO numbers of the starting materials, under the highly idealized assumption that the Voranol P400 has a functionality of exactly 2, and the Voranol CP 1055 has a functionality of exactly 3.

To start with, all of the starting materials listed, apart from the MP Diol and the Vestanat IPDI, were mixed at a temperature of 70° C. and a pressure of 100 mbar for 1.5 hours. The MP Diol was then mixed in for 15 minutes, and subsequently the Vestanat IPDI, likewise over a time of 15 minutes. As a result of the heat of reaction produced, the mixture underwent heating to 110° C., and was then dispensed into storage containers.

The NCO/OH ratio was 0.91. The theoretical gel point is likewise calculated as 0.91. 10.0% of the hydroxyl groups introduced to form the hydroxyl-functionalized polyurethane hotmelt prepolymer originate from a polypropylene glycol having a functionality of more than two and a number-average molar mass of 1000 g/mol. Accordingly around 6.9% of the starting-material molecules carrying OH groups are trifunctional. Overall, in an idealized consideration, 3.6% of the molecules participating in the molecular construction of the hydroxyl-functionalized polyurethane hotmelt prepolymer are trifunctional and hence capable of forming branched structures. 100% of the molecules participating in the molecular construction of the hydroxyl-functionalized polyurethane hotmelt prepolymer have a relative molar mass of less than or equal to 1000 (in an idealized consideration).

The resulting prepolymer was solid at room temperature with a brittle hardness, and in terms of consistency was not tacky (not pressure-sensitively adhesive). G' both at 1 rad/sec and at 10 rad/sec was greater than $10^6$ Pa, in each case at 25° C. Viscoelastic properties advantageous for PSA applications were not in evidence.

Comparative Example 2

A hydroxyl-functionalized polyurethane hotmelt prepolymer was prepared by homogeneously mixing and therefore chemically reacting the following starting materials in the proportions specified:

TABLE 10

Composition of the hydroxyl-functionalized polyurethane hotmelt prepolymer, Comparative Example 2

| Starting material | Weight fraction (% by weight) | Percentage ratio of the number of OH groups to one another | Percentage ratio of the number of molecules carrying OH groups to one another (idealized)* | Percentage ratio of the number of all functionalized molecules to one another (idealized)* |
|---|---|---|---|---|
| Voranol P400 | 45.0 | 50.0 | 50.0 | 25.3 |
| MP Diol | 9.4 | 50.0 | 50.0 | 25.3 |
| Coscat 83 | 0.1 | | | |
| Vestanat IPDI | 45.5 | | | 49.4 |
| Total | 100.0 | 100.0 | 100.0 | 100.0 |

*calculated from the weight fractions and the OH numbers or NCO numbers of the starting materials, under the highly idealized assumption that the Voranol P400 has a functionality of exactly 2.

To start with, all of the starting materials listed, apart from the MP Diol and the Vestanat IPDI, were mixed at a temperature of 70° C. and a pressure of 100 mbar for 1.5 hours. The MP Diol was then mixed in for 15 minutes, and subsequently the Vestanat IPDI, likewise over a time of 15 minutes. As a result of the heat of reaction produced, the mixture underwent heating to 110° C., and was then dispensed into storage containers.

The NCO/OH ratio was 0.98. The theoretical gel point is calculated as 1.0. 0% of the hydroxyl groups introduced to form the hydroxyl-functionalized polyurethane hotmelt prepolymer originate from a polypropylene glycol having a functionality of more than two and a number-average molar mass of 1000 g/mol. Therefore there is no trifunctional starting-material molecule. 100% of the molecules participating in the molecular construction of the hydroxyl-functionalized polyurethane hotmelt prepolymer have a relative molar mass of less than or equal to 1000 (in an idealized consideration).

The resulting prepolymer was solid at room temperature with a brittle hardness, and in terms of consistency was not tacky (not pressure-sensitively adhesive). G' both at 1 rad/sec and at 10 rad/sec was greater than $10^6$ Pa, in each case at 25° C. Viscoelastic properties advantageous for PSA applications were not in evidence.

The invention claimed is:

1. A hydroxyl-functionalized polyurethane hotmelt prepolymer comprising the chemical reaction product of isocyanate-reactive starting materials with at least one isocyanate-containing starting material, wherein the isocyanate-reactive starting materials of the hydroxyl-functionalized polyurethane hotmelt prepolymer comprise at least one polypropylene glycol PI having a functionality of more than two and a number-average molar mass of greater than or equal to 3000 g/mol, at least one polypropylene glycol PII having a functionality of less than or equal to two and a number-average molar mass of less than or equal to 1000 g/mol, and at least one chain extender KI having a functionality of less than or equal to two and a number-average molar mass of less than or equal to 400 g/mol, and wherein the isocyanate-containing starting material of the hydroxyl-functionalized polyurethane hotmelt prepolymer comprises an aliphatic or alicyclic diisocyanate.

2. The hydroxyl-functionalized polyurethane hotmelt prepolymer as claimed in claim 1, wherein the numerical fraction of the hydroxyl groups that are introduced to form the hydroxyl-functionalized polyurethane hotmelt prepolymer and that originate from the polypropylene glycol PI is at least 2.5%.

3. The hydroxyl-functionalized polyurethane hotmelt prepolymer according to claim 1 wherein the number-average molar mass of the polypropylene glycol PI is greater than or equal to 4500 g/mol.

4. The hydroxyl-functionalized polyurethane hotmelt prepolymer according to claim 1 wherein the number-average molar mass of the polypropylene glycol PII is less than or equal to 800 g/mol.

5. The hydroxyl-functionalized polyurethane hotmelt prepolymer as claimed in claim 1 wherein the aliphatic or alicyclic diisocyanate comprises isophorone diisocyanate or dicyclohexylmethane diisocyanate.

6. The hydroxyl-functionalized polyurethane hotmelt prepolymer according to claim 1 wherein the ratio of the total number of isocyanate groups to the total number of hydroxyl groups of the substances involved in the chemical reaction to give the hydroxyl-functionalized polyurethane hotmelt prepolymer is between greater than or equal to 0.80 and less than or equal to 0.98.

7. A process for preparing a hydroxyl-functionalized polyurethane hotmelt prepolymer according to claim 1 wherein the chemical reaction to give the hydroxyl-functionalized polyurethane hotmelt prepolymer takes place with addition of a catalyst comprising bismuth and carbon.

8. A pressure sensitive adhesive comprising a hydroxyl-functionalized polyurethane hotmelt prepolymer according to claim 1.

9. An adhesive tape carrier material comprising a hydroxyl-functionalized polyurethane hotmelt prepolymer according to claim 1.

10. A method for producing polyurethane moldings or polyurethane layers comprising the steps of reacting the hydroxyl functionalized polyurethane hotmelt prepolymer according to claim 1 with one or more polyisocyanates to make a reaction product and shaping the reaction product.

11. The method according to claim 10 wherein the reaction product of the polyurethane hotmelt prepolymer with the polyisocyanate or polyisocyanates possesses pressure-sensitively adhesive properties.

12. The method according to claim 10 wherein the reaction of the polyurethane hotmelt prepolymer with the polyisocyanate or polyisocyanates takes place solventlessly in the melt.

13. The method according to claim 10 wherein the reaction of the polyurethane hotmelt prepolymer with the polyisocyanate or polyisocyanates takes place in a continuously operating mixing assembly.

14. The method according to claim 10 wherein the reaction time of the polyurethane hotmelt prepolymer with the polyisocyanate or polyisocyanates prior to shaping does not exceed 10 minutes.

15. The hydroxyl-functionalized polyurethane hotmelt prepolymer as claimed in claim 2 wherein the numerical fraction of the hydroxyl groups that are introduced to form the hydroxyl-functionalized polyurethane hotmelt prepolymer and that originate from the polypropylene glycol PI is between 5% to 20%.

16. The hydroxyl-functionalized polyurethane hotmelt prepolymer according to claim 1 wherein number-average molar mass of the polypropylene glycol PI is greater than or equal to 5500 g/mol.

17. The hydroxyl-functionalized polyurethane hotmelt prepolymer according to claim 4 wherein the number-average molar mass of the polypropylene glycol PII is less than or equal to 600 g/mol.

18. The hydroxyl-functionalized polyurethane hotmelt prepolymer according to claim 6 wherein the ratio of the total number of isocyanate groups to the total number of hydroxyl groups of the substances involved in the chemical reaction to give the hydroxyl-functionalized polyurethane hotmelt prepolymer is between greater than or equal to 0.90 and less than or equal to 0.96.

19. The process according to claim 7 wherein the catalyst comprises bismuth carboxylate or a bismuth carboxylate derivative.

20. The hydroxyl-functionalized polyurethane hotmelt prepolymer according to claim 1 wherein the chain extender KI has a number-average molar mass of less than or equal to 200 g/mol.

\* \* \* \* \*